United States Patent
Rebuffet et al.

(10) Patent No.: US 7,300,080 B2
(45) Date of Patent: Nov. 27, 2007

(54) BUMPER SYSTEM

(75) Inventors: Olivier Rebuffet, Paris (FR); Klaus Fritz, Radolfzell (DE); Serge Bompard, Paris (FR)

(73) Assignee: Alcan Technology & Management Ltd., Neuhausen (CH)

( * ) Notice: Subject to any disclaimer, the term of this patent is extended or adjusted under 35 U.S.C. 154(b) by 11 days.

(21) Appl. No.: 11/433,929

(22) Filed: May 15, 2006

(65) Prior Publication Data

US 2006/0255603 A1 Nov. 16, 2006

(30) Foreign Application Priority Data

May 13, 2005 (CH) .................................. 0852/05

(51) Int. Cl.
*B60R 19/03* (2006.01)
(52) U.S. Cl. .................. 293/120; 293/102; 293/133
(58) Field of Classification Search ................ 293/120, 293/102, 132, 135, 122
See application file for complete search history.

(56) References Cited

U.S. PATENT DOCUMENTS

| | | | | |
|---|---|---|---|---|
| 4,272,114 A * | 6/1981 | Hirano et al. ................ 293/133 |
| 5,785,367 A | 7/1998 | Baumann et al. |
| 6,068,330 A | 5/2000 | Kasuga et al. |
| 6,174,009 B1 * | 1/2001 | McKeon ..................... 293/133 |
| 6,604,884 B1 * | 8/2003 | Ohkura ........................ 403/187 |
| 6,672,654 B2 * | 1/2004 | Yamada et al. ............. 296/205 |
| 6,802,522 B1 * | 10/2004 | Park et al. .................... 280/495 |
| 6,863,321 B2 * | 3/2005 | Jonsson et al. ............. 293/120 |
| 6,955,023 B2 * | 10/2005 | Rotheroe .................. 296/146.6 |
| 2001/0017473 A1 * | 8/2001 | Yamamoto ................... 293/122 |
| 2004/0041416 A1 * | 3/2004 | Harrison et al. ............ 293/117 |
| 2004/0201254 A1 | 10/2004 | Liebhard et al. |
| 2005/0067845 A1 | 3/2005 | Frank |
| 2007/0040398 A1 * | 2/2007 | Lutke-Bexten et al. ..... 293/102 |

FOREIGN PATENT DOCUMENTS

| | | |
|---|---|---|
| DE | 19902478 | 7/2000 |
| DE | 10110332 | 9/2002 |
| EP | 0949092 | 10/1999 |
| EP | 1361082 | 11/2003 |
| JP | 2003002136 | 1/2003 |
| JP | 2004090709 | 3/2004 |

* cited by examiner

*Primary Examiner*—Kiran B. Patel
(74) *Attorney, Agent, or Firm*—Klaus P. Stoffel; Wolf & Samson PC

(57) ABSTRACT

A bumper system having a bumper running transverse to the longitudinal direction of a vehicle and at least one connecting element mounted thereon for the purpose of attaching the bumper to a vehicle, in particular to a longitudinal beam of a passenger car. The connecting element is a multi-chamber extruded section of metal with longitudinal axis running in the longitudinal direction of the vehicle. The connecting element is in the form of a safety element which, under impact, absorbs impact energy by compressive deformation. For the purpose of connecting a towing device, an attachment member is provided that is situated in one of the hollow chambers of the connecting element.

10 Claims, 3 Drawing Sheets

Fig. 4
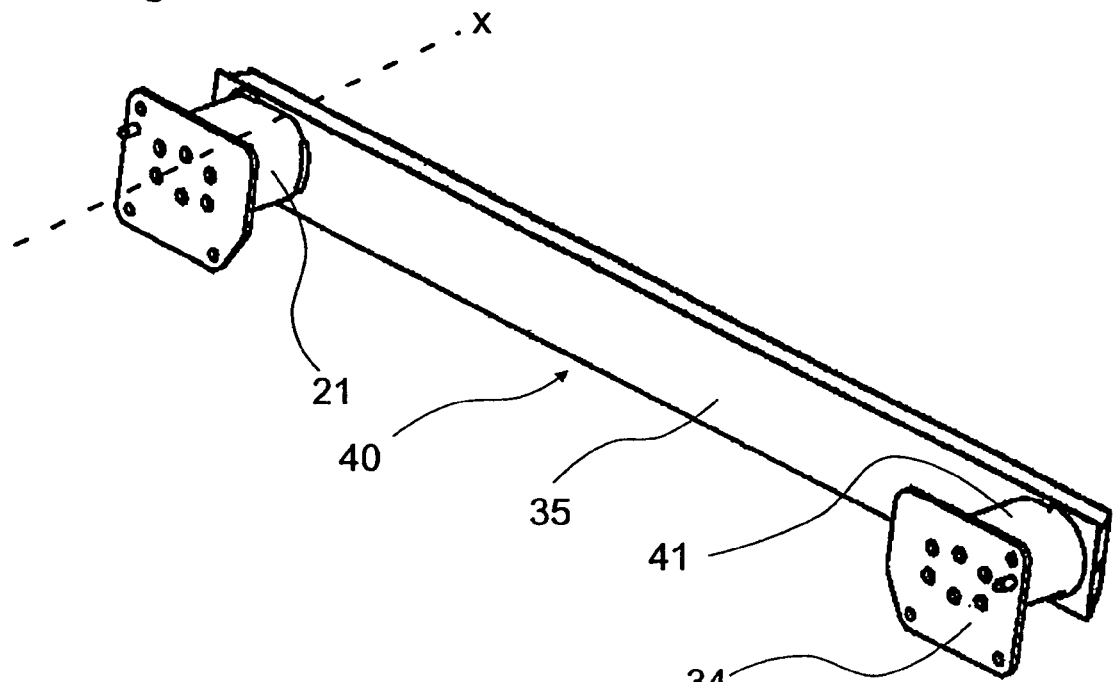
Fig. 5
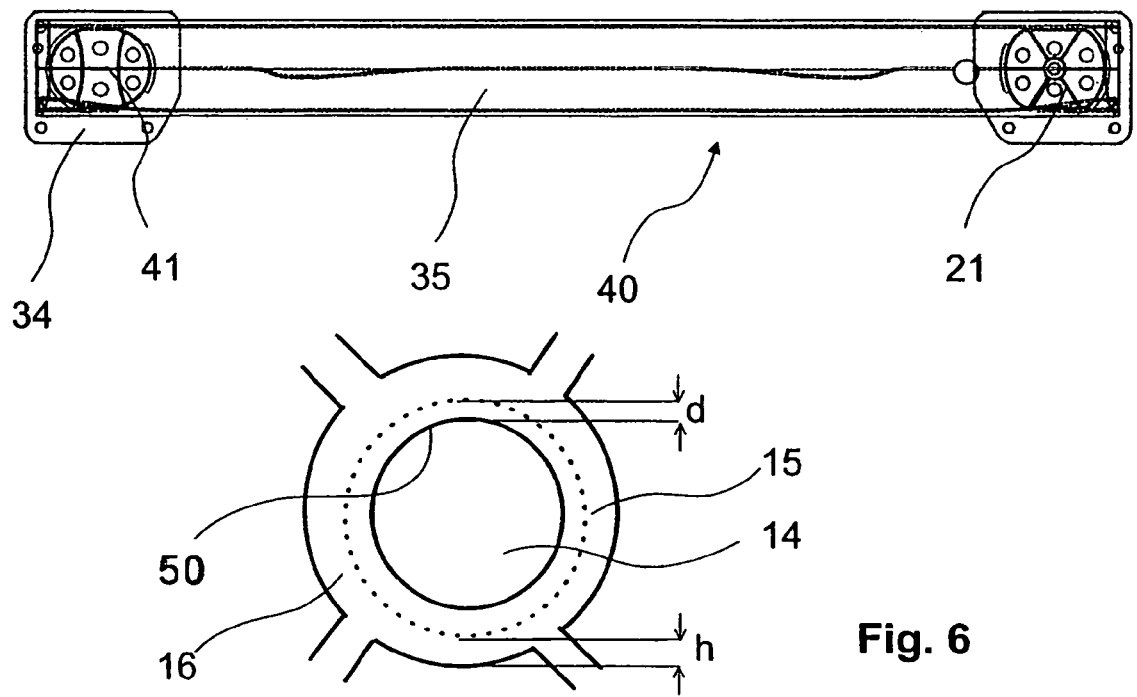
Fig. 6

BUMPER SYSTEM

BACKGROUND OF THE INVENTION

The present invention relates to a bum per system containing a bumper running transverse to the longitudinal direction of a vehicle, a connecting element on the bumper for attaching the bumper to a vehicle, in particular onto the longitudinal beam of a passenger car, and attachment means for mounting a releasable towing facility. The connecting element is a multi-chamber extruded section of metal having a longitudinal axis (x) lying in the longitudinal direction of the vehicle. The connecting element is in the form of a safety element which under impact conditions absorbs impact energy by compressive deformation. The invention relates also to a process for manufacturing the bumper system according to the invention.

Bumper systems with the above mentioned structure are also required to protect the vehicle structure behind them from the impact energy acting on the vehicle when the impact is small. For that reason the connecting elements are often in the form of hollow, multi-chamber sections which on impact absorb energy in the longitudinal direction of the section by plastic deformation, in particular by a planned folding action. The bumper systems must therefore be easy to repair in order that these or individual components thereof e.g. bumper or connecting element can be replaced at relatively low cost after suffering impact.

Usually the bumper system also includes attachment means which enable the vehicle to be towed away when involved in an accident. As a rule these attachment means comprise a thread provided in the bumper system into which a towing hook can be screwed. In many types of vehicle the thread is provided in the bumper. The tensile force caused by the towing action is then transmitted via the bumper into the vehicle structure or frame.

Also known are bumper systems in which a threaded socket is welded at the side on the wall of the connecting element. The towing hook is then introduced through an opening in the bumper and screwed into the threaded socket. The advantage of this solution is that the tensile force acts directly on the connecting element and the bumper is not subjected to loading.

If the attachment means is mounted on the connecting element, then care should be taken that the energy absorbing properties of the connecting element are not impaired. This means that, in spite of this attachment means, the connecting element should exhibit optimum compression or folding behavior on collision.

In both cases, providing the bumper system with an attachment means for a towing hook involves considerable additional expense as the inner thread has to be created in separate working steps, often by hand e.g. by welding.

SUMMARY OF THE INVENTION

The object of the present invention is to provide an improved bumper system with integral attachment means for fitting on a towing facility which, in comparison with bumper systems to date, is characterized by better integration of the attachment means.

That objective is achieved by way of the invention in that the attachment means is situated in one of the hollow chambers of the connecting elements.

The connecting element is preferably in the form of a deformation element, also known as a crash box, and is characterized in that it exhibits optimum folding behavior on collision. The folding behavior is determined among other things by the material i.e. the metal alloy, by the heat treatment of the connecting element and by the geometrical cross-section of the connecting element, in particular by the arrangement of the section walls, the struts and their thickness.

The hollow chamber which accommodates the attachment means is usefully made up of the inner section walls. The hollow chamber is in particular preferably in the form of a hollow cylinder i.e. the hollow chamber exhibits a circular cross-section. The hollow chamber is preferably situated inside the connecting element delimited by outer section walls and is connected with the outer section wall of the connecting element via one or more connecting struts. The hollow chamber is preferably situated in a central region of the connecting element. This may e.g. be the geometric middle point, whereby possible axes of symmetry of the hollow chamber cut across or intersect each other inside the hollow chamber. The connecting struts preferably lead essentially radially outwards from the central hollow chamber.

The hollow chamber may also be situated inside the connecting element, however at the edge. In that case a part of the hollow chamber is formed by the outer section wall. The hollow chamber may also be a hollow chamber formed by extrusion on the side of the connecting element.

An essential aspect of the invention is that the hollow chamber which accommodates the attachment means is shape-formed in an extrusion process for manufacturing an initial section and is therefore an integral part of the section. The connecting element is manufactured from the initial section in subsequent processing steps.

The connecting element is preferably made from an extruded light metal section. The connecting element is preferably of aluminium or an aluminium alloy.

The attachment means for connecting the towing facility preferably comprises an internal thread into which the towing facility can be screwed.

In a first version of the invention the internal thread is integrated in the section wall of the hollow chamber i.e. the internal thread is an integral component of the section wall. The internal thread is made in the section wall of the hollow chamber preferably using a chip-forming process such as cutting, turning, milling, boring etc.

The hollow chamber is in this case usefully cylindrical in shape. The section wall of the initial section which delimits the hollow chamber preferably exhibits a wall thickness (h+d). The wall thickness is preferably thicker than the section strut and/or the other section walls by a specific amount, in particular by an amount (d).

The internal thread preferably runs a defined length of the hollow chamber which is shorter than the entire length of the hollow chamber. The internal thread may be situated in the end part of the connecting element facing the bumper, in the end part of the connecting element facing the passenger space or in an intermediate region. The internal thread may however also run the whole length of the connecting element.

The section wall of the hollow chamber lying ahead of the internal thread in the direction of screwing-in the towing facility is preferably removed likewise in a chip removing process such as cutting, milling, boring by a specific amount, in particular by an amount (d), thus broadening the hollow chamber so that the peaks of the thread project beyond the recessed section wall.

In a particularly preferred version of the invention the section wall of the hollow chamber, possibly ahead of the internal thread in the direction of screwing, is likewise removed in a chip forming process, partially i.e. at least in a length immediately ahead of the internal thread or completely by a specific amount, in particular by the amount (d) by broadening the hollow chamber, so that the peaks of the thread project out from the recessed section wall.

Recessing or removing the section wall in the part of the section wall neighboring the internal thread is, on the one hand, necessary in order that the towing facility can be introduced and screwed into the hollow chamber. On the other hand, the section wall should not exceed a certain thickness in order that the compression or folding behavior and with that the energy absorption capacity of the connecting element is not impaired.

This means that the section wall of the hollow chamber is thicker in the extruded initial section than a specific amount (h) at least by the amount (d) of the peaks of the thread and subsequently the wall region lying outside the internal thread is removed to the specific thickness (h) so that only the peaks of the thread exhibit a wall thickness of (h+d).

If the hollow chamber concerns such a chamber shape-formed in an extrusion process on the side of the connecting element, then the material is preferably removed from the connecting element on the chamber length accommodating the internal thread e.g. by sawing, cutting or milling away from the connecting element.

In a second version of the invention the attachment means comprise an insert part exhibiting an internal thread which is inserted into the hollow chamber of the connecting element and fixed in place there.

The insert preferably exhibits the cross-sectional geometry of the hollow chamber so that it can be fitted by virtue of shape therein. The insert may e.g. be fixed in the hollow space by attachment means introduced through the section wall such as rivets or bolts, or by means of adhesive. The insert may also be pressed into the hollow chamber and fixed there by a clamping action. Further, in the connecting element, provision may be made for a stop against which the insert rests in the pulling direction of the towing device. The stop may e.g. be in the form of a step in the section wall surface of the hollow chamber. This step may e.g. be in the form of a sudden change in the thickness of the section wall, whereby the change in the section wall thickness may be created by a chip-forming process.

The insert is preferably of metal such as steel or aluminium or an aluminium alloy, in particular a hard aluminium alloy. The insert may, however, also be made of plastic.

In a particularly preferred further embodiment of the invention the insert is a cylindrical sleeve containing an internal thread. This is inserted, form-locking in a cylindrical hollow chamber of the connecting element, and fixed into place there by one of the above mentioned methods.

If the hollow chamber is such a chamber shape-formed in an extrusion process on the side of the connecting element, then this is preferably removed from the connecting element on the chamber length accommodating the internal thread e.g. by sawing, cutting or milling away from the connecting element.

The towing device comprises preferably a towing or screw-in hook with a bolt exhibiting an outer thread. This threaded bolt can be screwed into the internal thread in the connecting element. The towing hook is preferably of metal, in particular steel.

The bumper is preferably of metal such as steel, and in particular a light weight metal such as aluminium or an aluminium alloy. The bumper is preferably a single or multi-chamber hollow section. The bumper is preferably manufactured from an extruded section.

The extended axis of the internal thread of the attachment means passes through the bumper and defines a region in which an opening penetrating the bumper is provided. The screw-type towing bolt can be passed through this opening in the direction of the internal thread. The opening is of course situated in the region of the connecting element.

The bumper system according to the invention may be employed both in the front and at the rear of the vehicle. The bumper system preferably contains two connecting elements that are arranged side-by-side a distance apart and are attached either directly or indirectly to the vehicle structure, in particular to the two longitudinal beams of the vehicle body.

The connecting elements may e.g. be connected to the longitudinal beams via connecting plates such as stop rods. In that case the connecting elements are welded to the stop rods. Further, the connecting elements may also be inserted into the longitudinal beams and e.g. bolted onto them.

The connecting elements may be welded at the the front to the tensile strut or bolted on there. In the last mentioned version the section walls of the connecting element form a region which overlaps the bumper, where the bolted connection is made. Further, the connecting elements may also be pushed into the bumper i.e. a certain distance into it. To that end recesses are provided in the bumper. The connecting elements may be inserted up to the front, compression strut of the bumper.

Both connecting elements situated at the sides may exhibit the same cross-sectional geometry. As a rule only one of the attachment means is designed to accommodate a towing hook; for that reason the second connecting element exhibits a cross-sectional geometry that differs from that of the first connecting element containing the attachment means.

The bumper system preferably finds application in road-bound vehicles such as passenger cars, delivery vehicles, vans or small buses.

The invention relates also to a process for manufacturing the mentioned bumper system. The process is characterized in that, a cylindrical hollow chamber is integrated in an initial section produced by an extrusion process, and the initial section is cut to length as connecting elements and, using a chip-forming process, an internal thread is worked into the inner section wall over a specific length in the cylindrical hollow chamber. Using a chip-forming process, material is removed from at least the length of section wall ahead of the internal thread in the direction of screwing in a towing device, preferably over the lengths of section wall on both sides of the internal thread, this by an amount (d), so that the peaks of the thread project up from the worked inner section wall by an amount (d).

The integration of the attachment means, in particular the internal thread, in the connecting element results in better transmission of the tensile forces into the vehicle structure during a towing operation. The arrangement of the attachment means according to the invention is also robust with respect to a tensile force applied at a large angle to the longitudinal direction of the vehicle. Working the internal thread into a cylindrical hollow chamber in the connecting element also results in a reduction in the number of parts and the number of production steps. In particular manual operations such as welding or incorporation of pre-made sleeves in the bumper or on connecting elements can be replaced by automated production steps such as chip-forming processes. Both effects lead to a reduction in costs.

BRIEF DESCRIPTION OF THE DRAWINGS

In the following the invention is described in greater detail by means of examples and with reference to the accompanying drawings which show in:

FIG. 4: is a perspective view of a bumper system;

FIG. 5: is a view through a bumper system viewed in the driving direction according to FIG. 4; and FIG. 6: is an enlarged cross-section through the central hollow chamber according to FIG. 2.

DETAILED DESCRIPTION OF THE INVENTION

Figure 1:
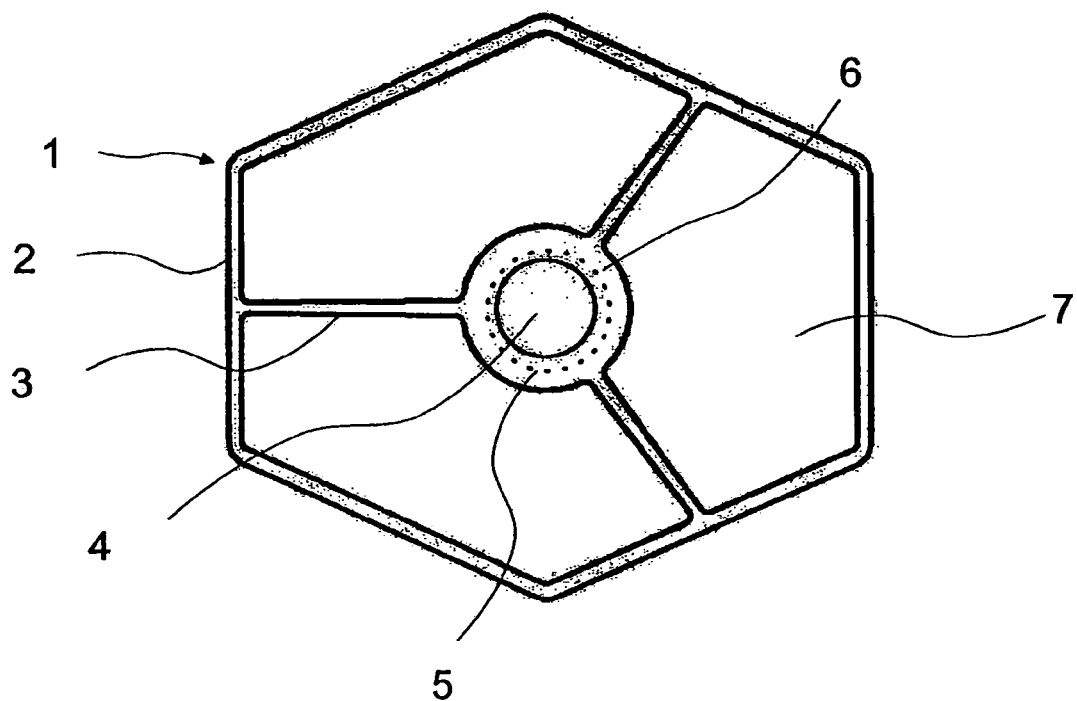
FIG. 1: is a cross section through a first connecting element.

FIG. 1 shows a first version of a connecting element 1 according to the invention with a hexagonal cross-section. The connecting element 1 is a multi-chamber hollow section with four hollow chambers 4, 7. It contains outer section walls 2 and one central, cylindrical hollow chamber 4 formed by an inner section wall 6. The hollow chamber 4 is connected to the outer section walls 2 by connecting struts 3. The connecting struts 3 run essentially radially from the central hollow chamber 4 outwards to the outer section walls 2.

The broken line 5 outlines the inner circumference of the hollow chamber 4 after removing part of the wall thickness of the inner section wall preceding—in the direction of screwing in the towing hook—the internal thread. The internal thread (not shown) of the attachment means is worked into the inner section wall 6 in a later, chip-forming process.

Figure 2:
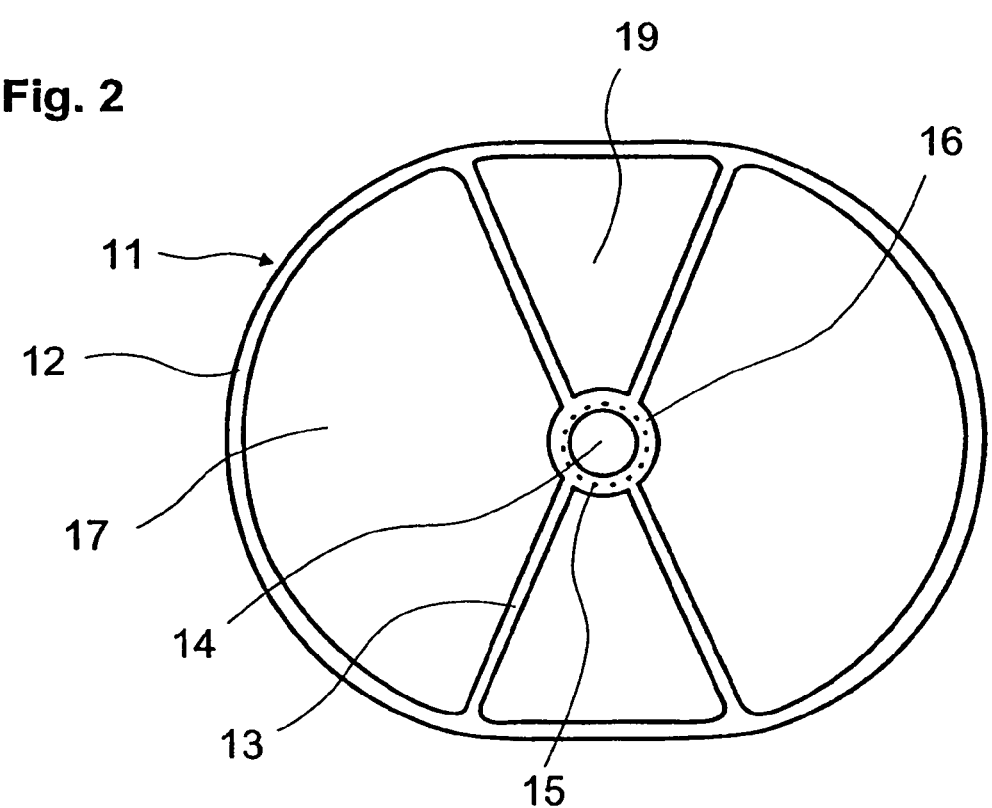
FIG. 2: is a cross section through a second connecting element.

FIG. 2 shows a second version of a connecting element 11 according to the invention having a roundish cross-section. The cross-section of the element in question contains two parallel, flat side walls that are joined together via arc lengths that curve outwards. The connecting element 11 is a multi-chamber hollow section with five hollow chambers 14, 17, 19. It contains outer section walls 12 and a central cylindrical hollow chamber 14 formed by an inner wall 16. The hollow chamber 14 is joined to the outer section walls 12 via connecting struts 13. The connecting struts 13 run from the central hollow chamber 14 essentially radially outwards to the outer walls 12.

The broken line 15 defines the inner circumference of the hollow chamber after removing a part of the wall thickness of the inner section wall preceding—in the direction of screwing in the towing hook—the internal thread. The internal thread (not shown) of the attachment means is worked into the inner section wall 16 in a later, chip-forming process.

Figure 3:
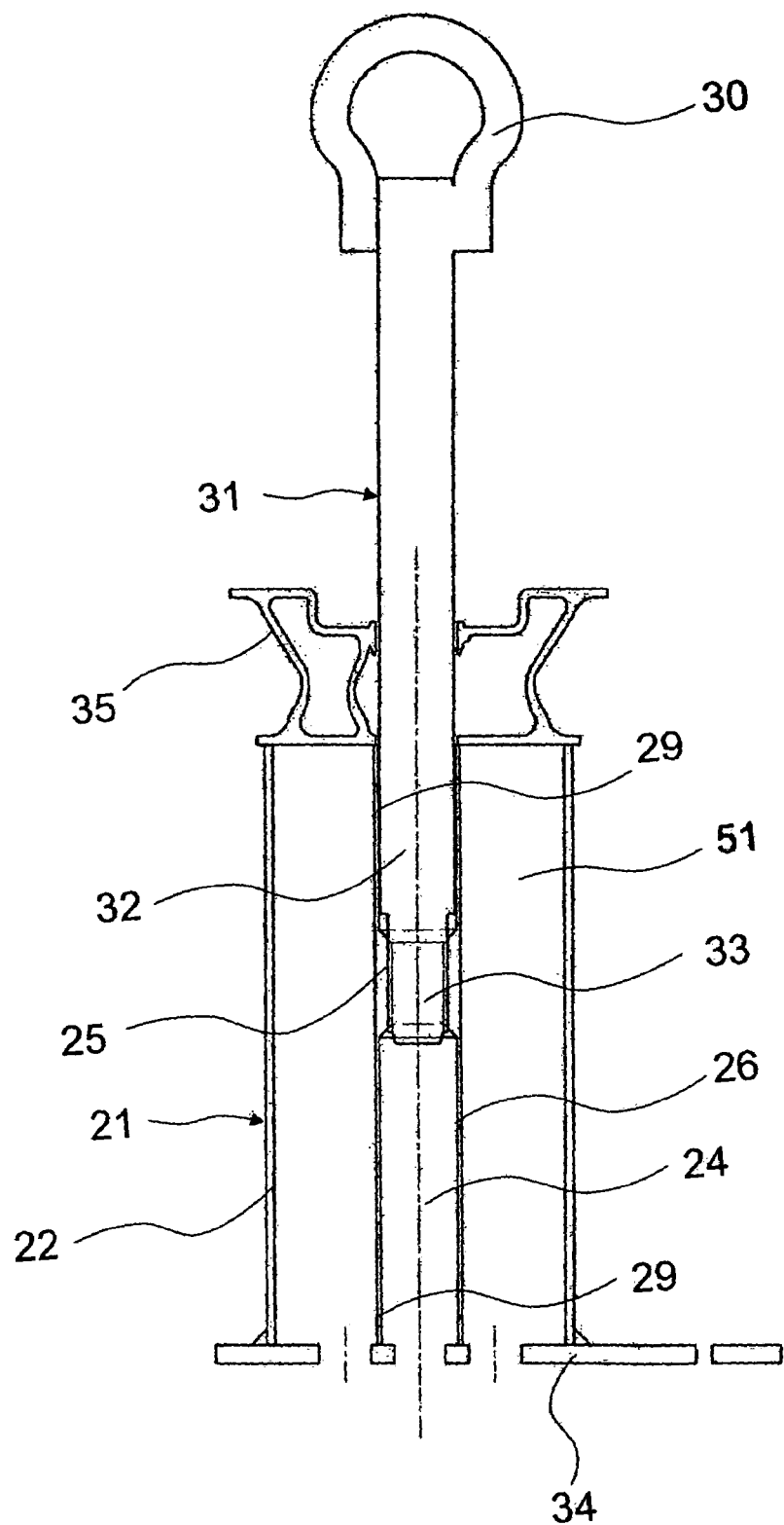
FIG. 3: is a longitudinal section through a bumper system with a towing hook mounted in place.

The connecting element 21 shown in FIG. 3 contains a central cylindrical hollow chamber 24 which is delimited by inner section wall 26. The hollow chamber contains an internal thread 25 worked into the inner section wall 26 over a defined length. Ahead of and after the internal thread 25 material has been removed from the inner section wall 26, thus enlarging the diameter of the hollow chamber by a certain amount in these regions. The peaks of the internal thread 25 project therefore beyond the inner face 29 of the inner wall 26. The front end of the connecting element 21 is connected to the bumper 35 and the other end is welded to a plate 34 over which the connecting element 21 is attached to the vehicle structure (not shown). The bumper 35 contains an opening through which a bolt 32 of a towing hook 31 is introduced into the central hollow chamber 24. The bolt 32 features an external thread 33 via which the towing hook 31 is screwed into the internal thread 25 of the connecting element 21. The towing hook 31 contains a ring-like part 30 onto which a tow rope or tow rod can be attached. The outer wall 22 defines a hollow chamber 51 with the inner wall 26.

FIG. 4 shows a bumper system 40 with a bumper 35 and connecting elements 21, 41 situated on both ends. The connecting elements are welded at a first end to the bumper 35. At the other end the connecting elements are welded to plates 34 via which the bumper system is attached to the vehicle structure.

FIG. 5 shows a view through the bumper system 40 according to FIG. 4 with the bumper 35 and the connecting elements 21, 41 situated at both ends. The connecting elements 21, 41 are welded at a first end to the bumper 35. At the second end the connecting elements 21, 41 are welded to the plate 34. The connecting elements 21, 41 exhibit essentially different cross-sectional geometries, whereby only connecting element 21 makes provision for an attachment means according to FIG. 2 to accommodate the towing hook.

FIG. 6 shows an enlarged view of part of the central, cylindrical-shaped hollow chamber 14 according to FIG. 2. The inner section wall 16 exhibits a specified thickness (h) which guarantees an optimal folding geometry of the connecting element acting as a deformation element. The extruded initial section is manufactured with an overall inner wall 16 thickness (h+d). On both sides of the length of section accommodating the internal thread the inner section wall 16 of the hollow chamber is worked in the inner region 50 by a chip-forming process to a depth (d) down to the specified thickness (h) (indicated by broken line 15). The peaks of the thread are basically worked out of the extra section wall 16 material of thickness (d) and stand out from the worked section wall inner face 50.

Although the present invention has been described in relation to particular embodiments thereof, many other variations and modifications and other uses will become more apparent to those skilled in the art. It is preferred, therefore, that the present invention be limited not by the specific disclosure herein, but only by the appended claims.

The invention claimed is:

1. A bumper system for a vehicle, comprising:
   a bumper running transverse to a longitudinal direction of the vehicle;
   at least one connecting element mounted on the bumper for attaching the bumper to the vehicle; and
   attachment means for attaching a releasable towing device, whereby the connecting element is a multi-chamber extruded section of metal with a longitudinal axis running in the longitudinal direction of the vehicle, and the connecting element is formed as a safety element which on impact absorbs impact energy by compressive deformation, the connecting element having a hollow chamber in which the attachment means is situated.

2. The bumper system according to claim 1, wherein the hollow chamber that accommodates the attachment means is cylindrically shaped.

3. The bumper system according to claim 1, wherein the hollow chamber that accommodates the attachment means is situated inside the connecting element and is delimited by inner section walls, and the hollow chamber is connected to outer section walls of the connecting element via at least one connecting strut.

4. The bumper system according to claim 1, wherein the attachment means includes an internal thread situated in the hollow chamber for fixing the towing device in place.

5. The bumper system according to claim 4, wherein the internal thread is integrated in an inner face of the section wall inside the hollow chamber.

6. The bumper system according to claim 5, wherein the internal thread is worked into the inner face of the section wall inside the hollow section by a chip-forming process.

7. The bumper system according to claim 1, wherein the attachment means includes an insert featuring an internal thread which is pushed into the hollow chamber of the connecting element and fixed in place there.

8. The bumper system according to claim 7, wherein the insert is a cylindrical sleeve having an internal thread, which is pushed into a cylindrical hollow chamber.

9. The bumper system according to claim 4, wherein the towing device comprises a screw-in hook having an outer thread, which can be screwed into the internal thread of the attachment means in the connecting element.

10. The bumper system according to claim 1, wherein the towing device has a threaded bolt and the bumper has an opening passing through it, through which the towing hook with its threaded bolt can be passed from outside to the attachment means in the connecting element.

* * * * *